United States Patent [19]
Beatty

[11] Patent Number: 5,135,279
[45] Date of Patent: Aug. 4, 1992

[54] WINDSHILED SHADE ASSEMBLY FOR MOTOR VEHICLES

[76] Inventor: Annetta Beatty, 525 Beach Ave., Bronx, N.Y. 10473

[21] Appl. No.: 728,647

[22] Filed: Jul. 11, 1991

[51] Int. Cl.$^5$ .............................................. B60J 3/02
[52] U.S. Cl. ................................. 296/97.1; 296/97.8; 296/97.11; 296/97.2; 160/171; 160/370.2; 359/493
[58] Field of Search ............... 296/97.2, 97.8, 97.1, 296/97.4, 97.11; 160/370.2, 171; 359/492, 493, 501; 362/19

[56] References Cited

U.S. PATENT DOCUMENTS

| | | | |
|---|---|---|---|
| 3,056,626 | 10/1962 | Browne | 296/97.2 |
| 3,183,033 | 5/1965 | Stulbach | 296/97.2 |
| 3,868,293 | 2/1975 | Selph | 296/97.7 |
| 4,979,775 | 12/1990 | Klose | 296/97.8 |
| 4,988,139 | 1/1991 | Yamada | 296/97.2 |

FOREIGN PATENT DOCUMENTS 2854181 6/1980 Fed. Rep. of Germany ..... 296/97.2

Primary Examiner—Robert R. Song
Attorney, Agent, or Firm—Darby & Darby

[57] ABSTRACT

A shade assembly for a vehicle windshield includes an axle secured at its ends to two side brackets attachable at the windshield top at two opposite sides of the windshield. The axle is also supported at its middle portion by an intermediate bracket secured to the top of the windshield. Two hollow cylindrical shafts are arranged between the intermediate bracket and the two side brackets, respectively, for rotation about respective sections of the axle. Two flexible shade members made of a tinted and polarized flexible plastic material are secured to the two hollow shafts, respectively, at one of their opposite longitudinal edges so as to be unwound and rewound upon respective rotation of the hollow shafts.

7 Claims, 1 Drawing Sheet

WINDSHILED SHADE ASSEMBLY FOR MOTOR VEHICLES

BACKGROUND OF THE INVENTION

The present invention relates to a windshield shade assembly to be used in motor vehicles instead of sun visors.

Windshield shade assemblies for use in motor vehicles are known. Thus, U.S. Pat. No. 4,979,775 discloses a shade assembly for a vehicle windshield. This assembly comprises two brackets attachable at two opposite sides of the vehicle windshield at the top thereof, adjacent to respective side windows of the vehicle. A common intermediate bracket is supported at the top of the windshield in the middle region thereof. The assembly further includes two hollow cylindrical winding shafts supported, respectively, between the intermediate bracket and the respective side brackets. A trapezoidal shade member is secured to each of the shafts at its shorter longitudinal edge. As a result, the shade member can be unwound or rewound upon rotation of the shaft in a respective direction.

Each hollow winding shaft is supported for rotation at one end by a threaded spindle, which is non-rotatably secured in the intermediate bracket, and at the other end thereof, by a trunnion secured in a respective side bracket. The one end of the respective shaft and the respective spindle have matching inner and outer threads that enable axial displacement of the respective hollow shaft upon its rotation. The amount of the axial displacement of the hollow shaft is selected so that the oblique edge of the shade member is located closely adjacent to the respective adjacent oblique side of the windshield.

The shade in this prior arrangement is apparently opaque so that it acts like a standard and completely blocks the sun from entering the driver's eyes, but also limits the driver's vision. It would be advantageous to have a sun visor that protects the driver's eyes from the glare of the sun, while not limiting his vision.

SUMMARY OF THE INVENTION

The object of the present invention is to provide a windshield shade assembly for use in motor vehicles which assures enhanced protection for the driver's eyes from sunlight, without limiting his range of vision. The object of the invention is achieved by providing shade members made of a transparent polarized plastic material. Using the polarized plastic material permits to substantially reduce light reflections, thus protecting the driver's eyes from the glare of sunlight, while not restricting his field of view. Shades, according to this invention, also limit the total amount of sunlight entering the vehicle, which reduces the heat generated in the vehicle, particularly on the seats and steering wheel.

These and other objects of the invention will become more apparent from the following detailed description of the preferred embodiments when read in conjunction with the accompanying drawings.

DESCRIPTION OF THE PREFERRED EMBODIMENT

Figure 1:
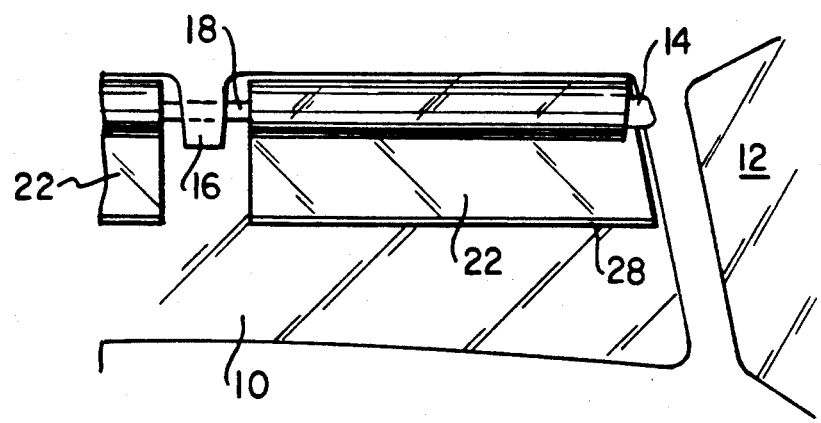
FIG. 1 is a partial view of a windshield shade assembly according to the invention with shade members partially unwound.
Figure 2:
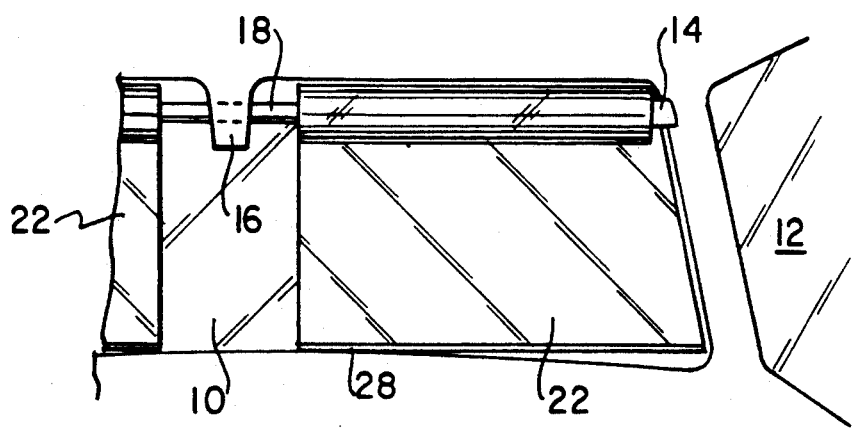
FIG. 2 is a partial view similar to that of FIG. 1, but with the shade members completely unwound.
Figure 3:
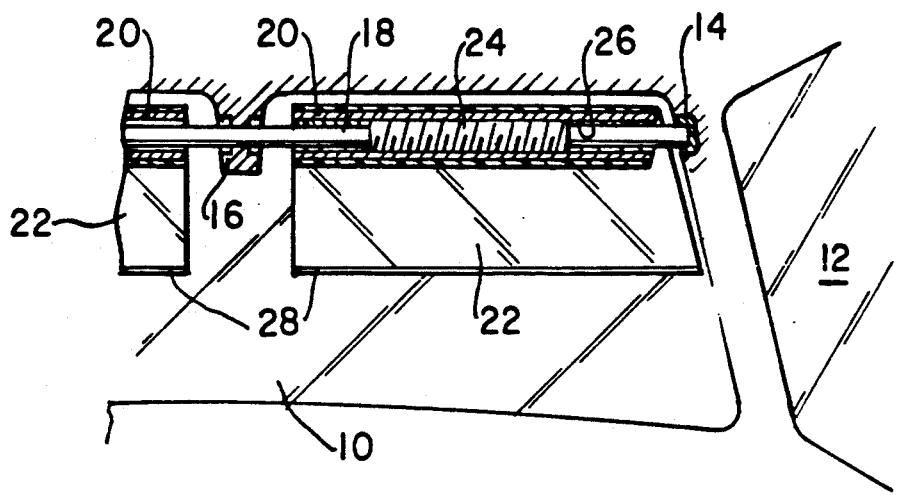
FIG. 3 is a partial cross-sectional view of the winding mechanism of a windshield shade assembly according to the invention.

In the drawings, reference numeral 10 designates a windshield of a motor vehicle, and reference numeral 12 designates adjacent side windows of the motor vehicle (only one window is shown in the drawings). The windshield shade assembly according to the invention comprises (a) two side brackets 14 (of which only one is shown) attached at the top of the windshield on its interior side adjacent a respective side window, and (b) an intermediate bracket 16 attached at the top of the windshield in the middle region thereof. A non-rotatable axle 18 is secured at its opposite ends in the side brackets 14 and is supported at the middle portion by the intermediate bracket 16. Two hollow cylindrical shafts 20, of which only one is completely shown, are supported between the intermediate bracket 16 and respective side brackets 14. The shafts 20 are arranged to rotate about the axle 18. A trapezoidal-shaped flexible shade member 22 is secured to each shaft 20 at its shorter longitudinal edge. The shade members 22 are made of a transparent polarized and/or tinted plastic material.

A section of the axle 18 extending between the intermediate bracket 16 and a respective side bracket 14 has a threaded portion 24 with an outer thread which cooperates with an inner thread 26 of a respective shaft 20. These matching inner and outer threads provide for axial displacement of the shaft 20 upon rotation thereof. The threaded portions 24 of the two sections of the axle 18 represent a mirror image of each other and are so selected that shaft 20 is displaced, upon unwinding of the shade member, in a direction toward a respective side bracket 14, and in an opposite direction, upon rewinding of the shade member.

Each of the hollow rotatable shafts 20 may be provided with a conventional rewind mechanism (not shown) including spring means, or a rewind mechanism driven by an electrical motor. The shorter longitudinal edge of the shade member 22 may be fixedly received in a longitudinal groove, not shown, provided on the outer circumferential surface of the shaft 20. The free longer longitudinal edge of the member 22 may have a heavy metal or plastic strip 28 attached thereto for grasping by the vehicle occupant. When a spring rewind mechanism is used, the strip 28 may include means for engaging respective hook means attached at the bottom of the windshield, to hold the shade down.

In the middle region of the windshield 10, there remains a narrow unprotected zone not covered with the shade members. If desired, an independent shade assembly, which may be attached to the intermediate bracket, can be used for screening this zone.

The operation of the windshield shade assembly according to the invention should be clearly understood from the foregoing description of its structure, but will be explained for completeness of the disclosure. In the rewind condition, the shade member 22 is wound unto the shaft 20 by appropriate spring means. When an occupant of the vehicle wishes to protect the vehicle or himself from sunlight, the occupant pulls the shade member down manually by grasping the strip 28 or, when an electrically-driven rewind mechanism is used, switches the electric motor on.

Although the present invention has been described in connection with the preferred embodiment, many other variations and modifications are possible. Thus, the shade member according to the invention may be used with the structure of the windshield shade assembly disclosed in U.S. Pat. No. 4,979,775, and the hollow shaft may be supported for rotation in the manner disclosed therein. In another modification, instead of threaded spindles, smooth spindles can be used. These spindles are provided with helical grooves cooperating with pins attached to the interior surfaces of the respective hollow shafts 20.

In use, the shade can be completely wound up on the axle when there is no sun glare or the glare of approaching light, during the night. However, when light is entering the windshield, the shade may be lowered only enough to block that light, as with conventional opaque sun visors. The shade of the present invention provides substantially the same light blocking effort as a sun visor because it is made of polarized and, preferably, tinted, transparent flexible plastic. However, the transparency of the shade provides the user with an increased angle of vision that is missing with opaque sun visors. If necessary, the shade can be pulled down completely, and the driver will still be able to see through it sufficiently to drive.

Even when the vehicle is not is use, the shade may be pulled down to prevent sunlight from heating up surfaces in the vehicle.

While particular embodiments of the invention have been shown and described, various modifications thereof will be further apparent to those skilled in the art and, therefore, it is not intended that the invention be limited to the disclosed embodiments or to the details thereof, and the departures may be made therefrom within the spirit and scope of the invention as defined in the appended claims.

What is claimed is:

1. A shade assembly for a vehicle windshield comprising:
   at least two brackets attachable at a top of the windshield at respective spaced apart locations of the windshield; and
   at least one flexible shade member, said shade member being made of a transparent plastic polarized material that blocks a substantial portion of sunlight; and
   a shade winding mechanism secured between said at least two brackets, said shade winding mechanisms including a non-rotatable axle having opposite ends securable in said brackets and a cylindrical shaft rotatably mounted about said axle, said shade member being fastened by one longitudinal edge to the shaft so as to extend across at least a portion of said windshield and block sunlight when in an unwound position and be wound upon the shaft when in a wound position.

2. A shade assembly as in claim 1 wherein said shade winding mechanism further includes
   a spring member that is tensioned when the shade member is moved to the unwound position and acts to bias the shade member into the wound position, and
   a holding member, for holding the shade member in the unwound position against the tension of the spring member until released.

3. A shade assembly for a vehicle windshield comprising:
   two side brackets attachable at a top of the windshield at respective sides of the windshield and an intermediate bracket attachable at the top of the windshield in a middle region of the windshield;
   a shade winding mechanism including a non-rotatable axle having opposite ends securable in respective side brackets, said axle being supported in a middle portion thereof by said intermediate bracket, and two hollow cylindrical shafts located, respectively, between said intermediate bracket and respective side brackets and supported for rotation about said axle; and
   two flexible shade members made of a transparent plastic polarized material that blocks a substantial portion of sunlight, said two shade members being fastened at one longitudinal edge thereof to said two hollow shafts, respectively, to be unwound and rewound on said two shafts upon selective rotation of said two shafts in respective directions by said shade winding mechanism so as to cause said shade member to extend across said windshield and block sunlight when in an unwound position, and to be wound on said two shafts when in a wound position.

4. A shade assembly as set forth in claim 3 wherein each of said two shade members comprises a trapezoidal shade member secured to a respective hollow shaft at its shorter longitudinal edge.

5. A shade assembly as set forth in claim 1 wherein the shade member is made of a tinted plastic polarized material.

6. A shade assembly as set forth in claim 3 wherein the shade member is made of a tinted plastic polarized material.

7. A shade assembly for a windshield of a vehicle comprising:
   two coaxial winding shaft means extending between opposite sides of the windshield at a top of the windshield, each said shaft means including a non-rotatable axle having opposite ends and a cylindrical shaft rotatably mounted about said axle
   bracket means for supporting the opposite ends of the axles of each of said two winding shaft means for allowing rotation in opposite directions of the cylindrical shafts; and
   two flexible shade members secured at one longitudinal edge thereof to the cylindrical shafts of said two coaxial winding shaft means, respectively, to be unwound and rewound upon rotation of said two cylindrical shafts in respective directions, said two shade members being made of a flexible transparent plastic tinted and polarized material.

* * * * *